United States Patent
Zhou et al.

(10) Patent No.: US 10,800,892 B2
(45) Date of Patent: Oct. 13, 2020

(54) COMPOSITION OF NANO-EMULSION HAVING SMALL PARTICLE SIZE AND ULTRA-LOW CONCENTRATION AND A PREPARATION METHOD THEREOF

(71) Applicants: China University of Petroleum-Beijing, Beijing (CN); KMS OIL FIELD CHEMICALS & TECHNICAL SERVICES LTD. BEIJING, Beijing (CN); Zhong Shi Da Engineering Research Center Co. Ltd., Beijing (CN); PetroChina Company Limited, Beijing (CN)

(72) Inventors: Fujian Zhou, Beijing (CN); Erdong Yao, Beijing (CN); Jiangwen Xu, Beijing (CN); Zhao Luo, Beijing (CN); Yuan Li, Beijing (CN); Xiuhui Li, Beijing (CN); Jiaxin Sun, Beijing (CN); Xiongfei Liu, Beijing (CN); Jie Zuo, Beijing (CN); Xugang Wang, Beijing (CN); Cuihong Zhou, Beijing (CN)

(73) Assignees: China University of Petroleum-Beijing, Beijing (CN); KMS OIL FIELD CHEMICALS & TECHNICAL SERVICES LTD., Beijing (CN); Zhong Shi Da Engineering Research Center Co. Ltd., Beijing (CN); PetroChina Company Limited, Beijing (CN)

( * ) Notice: Subject to any disclaimer, the term of this patent is extended or adjusted under 35 U.S.C. 154(b) by 0 days.

(21) Appl. No.: 16/219,723

(22) Filed: Dec. 13, 2018

(65) Prior Publication Data

US 2019/0177491 A1 Jun. 13, 2019

(30) Foreign Application Priority Data

Dec. 13, 2017 (CN) .......................... 2017 1 1330829

(51) Int. Cl.
| | | |
|---|---|---|
| C08J 3/05 | (2006.01) | |
| C08K 5/05 | (2006.01) | |
| C08K 5/42 | (2006.01) | |
| C08K 5/19 | (2006.01) | |
| C08K 5/01 | (2006.01) | |

(52) U.S. Cl.
CPC .......... *C08J 3/05* (2013.01); *C08K 5/01* (2013.01); *C08K 5/05* (2013.01); *C08K 5/19* (2013.01); *C08K 5/42* (2013.01); *C08J 2353/00* (2013.01); *C08J 2371/02* (2013.01); *C08J 2371/08* (2013.01)

(58) Field of Classification Search
None
See application file for complete search history.

(56) References Cited

U.S. PATENT DOCUMENTS

| 2010/0137168 A1* | 6/2010 | Quintero | C11D 3/18 507/124 |
|---|---|---|---|
| 2015/0080273 A1* | 3/2015 | Hatchman | B01D 19/0404 507/219 |
| 2019/0242229 A1* | 8/2019 | Xu | C09K 8/602 |

FOREIGN PATENT DOCUMENTS

| CN | 102698622 A | 10/2012 |
|---|---|---|
| CN | 103721582 A | 4/2014 |
| CN | 105125426 A | 12/2015 |
| CN | 105419758 A | 3/2016 |
| CN | 106281767 A | 1/2017 |
| CN | 106609135 A | 5/2017 |
| WO | 2007112967 A | 10/2007 |

OTHER PUBLICATIONS

First Office Action and search report dated Jul. 29, 2019 for counterpart Chinese Patent Application No. 201711330829.8, along with machine EN translation downloaded from EPO, 18 pages.
I. Sole et al.; Study of nano-emulsion formation by dilution of microemulsions; Journal of Colloid and Interface Science 376, Mar. 7, 2012, Elsevier Inc., pp. 133-139.
T. Sottman et al.; Ultralow interfacial tensions in water-n-alkane-surfactant systems; Journal of Chemical Physics, May 22, 1997, vol. 106, No. 20, AIP Publishing, pp. 8606-8615.

* cited by examiner

*Primary Examiner* — Robert T Butcher
(74) *Attorney, Agent, or Firm* — Loza & Loza, LLP; Michael F. Fedrick

(57) ABSTRACT

A nano-emulsion composition having a small particle size and ultra-low concentration and a preparation method thereof is disclosed. The raw materials of the composition comprise, in terms of percentage by weight, 0.002% to 0.2% of a polymer-containing homogeneous microemulsion, water, and 99.998% to 99.8% of an organic salt solution or inorganic salt solution. The composition is prepared by diluting a polymer-containing homogeneous microemulsion with water or a salt solution. The polymer-containing homogeneous microemulsion is formed by mixing the following raw materials, in terms of percentage by weight: 8% to 40% of a surfactant, 0.5% to 10% of a polymer, 10% to 30% of an alcohol, 3% to 30% of an oil, 0% to 20% of a salt, and balance of water. The composition of the invention is low in concentration, low in cost, narrow in particle size distribution, good in stability, simple in preparation, and convenient for storage and use.

12 Claims, 3 Drawing Sheets

COMPOSITION OF NANO-EMULSION HAVING SMALL PARTICLE SIZE AND ULTRA-LOW CONCENTRATION AND A PREPARATION METHOD THEREOF

FIELD OF TECHNOLOGY

The invention belongs to the technical field of preparation of nano-emulsions, in particular it relates to a composition of nano-emulsion having small particle size and ultra-low concentration and a preparation method thereof.

BACKGROUND ART

Nano-emulsions are clear, transparent or translucent liquid-liquid dispersion systems with particle sizes from 10 to 200 nm. As compared to common emulsions, nano-emulsion droplets have a small particle size, uniform dispersion, stable performance (kinetic stability), and are capable of being not significantly flocculated and coalesced within months or even years. The large specific surface area and strong surface interfacial activity of nano-liquids make them widely used in petroleum exploitation, medicine, food, building energy conservation, concrete water conservation, agriculture, papermaking, wood-based panels, special ceramics, light industry and other fields.

The traditional preparation methods of nano-emulsions are mainly realized by high pressure and high shear of emulsion, such as high pressure homogenization methods and ultrasonic methods. Although these methods can produce nano-emulsions in batches, they have high energy consumption, high cost and easy contamination of the preparation. Moreover, the prepared nano-emulsion has poor stability, which makes the application of the nano-emulsion extremely limited.

In recent years, the preparation of low-energy nano-emulsions has received extensive attention, mainly including phase transformation methods and self-emulsification methods (Journal of colloid and interface science, 2012, 376(1): 133-139.). The phase transition method means that the curvature of the surfactant molecule is close to zero at the phase transition temperature, and the emulsion forms a lamellar phase or a bicontinuous phase, at which point the droplet size in the system is minimized. By rapidly changing the composition or temperature, these small sized droplets are diluted and fixed to form a nano-emulsion. However, the phase transition method requires fine control conditions and is not suitable for mass production, and there is still a distance from industrial applications. The self-emulsification method is generally realized by direct dilution of a microemulsion. However, in most cases, the stability of the obtained nano-emulsion tends to be poor due to the insufficient amount of surfactant in the dilution process to maintain an ultra-low interfacial tension.

In the prior art, there have been a few reports at home and abroad. For example, CN102698622A and CN103721582A each disclose a nano-emulsion system composed of a nonionic surfactant, an oil, a co-surfactants and a salt solution. The system is simple in formulation and stable in the long term, which meets the requirements of industrial production and storage. However, the system uses a higher amount of microemulsion (30%), has a larger particle size distribution (50 to 200 nm), and has a wide and irregular particle size distribution, which is not conducive to obtaining a system with stable performance. WO2007112967 reports that the surfactant is configured as an emulsion according to the hydrophilic-lipophilic balance (HLB) value, and then 30 to 70% salt solution is added to prepare a corresponding nano-emulsion system. The interface performance of the system is good (less than 1 mN/m) and the preparation is simple. However, there are also disadvantages in that the above microemulsion has to be used in a large amount and has a high cost. Therefore, how to develop a nano-emulsion system with low concentration, smaller particle size, narrow distribution and stability is still a problem to be solved.

SUMMARY OF THE INVENTION

In order to overcome the above deficiencies of the prior art, it is an object of the present invention to provide a composition of nano-emulsion having small particle size and ultra-low concentration and a preparation method thereof. The composition of nano-emulsion system is homogeneous and transparent, good in stability, narrow in particle size distribution, small in particle size (5 to 30 nm), low in concentration, low in cost, simple in preparation, and convenient for storage and use.

In order to achieve the above technical object, the present invention provides a composition of nano-emulsion having small particle size and ultra-low concentration, of which raw materials comprise, in terms of percentage by weight, 0.002% to 0.2% of a polymer-containing homogeneous microemulsion, water, and 99.998% to 99.8% of an organic salt solution or inorganic salt solution. The composition of nano-emulsion provided by the present invention is prepared by completely diluting a polymer-containing homogeneous microemulsion with water or salt solution, wherein the water can be distilled water or deionized water.

According to a specific embodiment of the present invention, preferably, the composition of nano-emulsion having small particle size and ultra-low concentration is a homogeneous transparent liquid-liquid dispersion system in which the emulsion has a particle size of 5 to 30 nm.

In the above composition of nano-emulsion having small particle size and ultra-low concentration, preferably, the organic salt solution or inorganic salt solution each has a concentration by mass of 0.001 to 20%.

In the above composition of nano-emulsion having small particle size and ultra-low concentration, preferably, the salts in the organic salt solution or inorganic salt solution comprise one or a combination of more of sodium salts, potassium salts, magnesium salts, calcium salts, aluminum salts, ammonium salts, and tetramethylammonium salts, respectively; more preferably, the salt can be one or a combination of more of NaCl, NaBr, KCl, KBr, $Na_2SO_4$, $K_2SO_4$, $MgCl_2$, $MgBr_2$, $CaCl_2$, $MgSO_4$, $AlCl_3$, $NH_4Cl$, $NH_4Br$, $N(CH_3)_4Cl$, and $N(CH_3)_4Br$.

In the above composition of nano-emulsion having small particle size and ultra-low concentration, preferably, the polymer-containing homogeneous microemulsion is formed by mixing the following raw materials, in terms of percentage by weight: 8% to 40% of a surfactant, 0.5% to 10% of a polymer, 10% to 30% of an alcohol, 3% to 30% of an oil, 0% to 20% of a salt, and balance of water, wherein the water can be distilled water or deionized water etc.

In the above composition of nano-emulsion having small particle size and ultra-low concentration, in the raw materials of the polymer-containing homogeneous microemulsion, preferably, the surfactant comprises one or a combination of more of a nonionic surfactant, a cationic surfactant and an anionic surfactant. Among them, the nonionic surfactant comprises one or a combination of more of alkyl polyoxyethylene ether, alkylamine polyoxyethylene ether, alkylphenol polyoxyethylene ether, castor oil polyoxyethylene ether and alkyl glycoside; more preferably, the alkyl polyoxyethylene ether, alkylphenol polyoxyethylene ether and castor oil polyoxyethylene ether have a polyoxyethylene value of 4 to 10. The cationic surfactant comprises one or a combination of more of alkyl trimethyl ammonium bromide and alkyl trimethyl ammonium chloride; preferably, the cationic surfactant comprises one or a combination of more of alkyl trimethyl ammonium bromide, alkyl trimethyl ammonium chloride and the like, more preferably one or a combination of more of dodecyl trimethyl ammonium bromide (DTAB), tetradecyl trimethyl ammonium bromide (TTAB), hexadecyl trimethyl ammonium bromide (CTAB), dodecyl trimethyl ammonium chloride (DTAC) and tetradecyl trimethyl ammonium chloride (TTAC). The anionic surfactant comprises one or a combination of more of hydrocarbyl carboxylate, hydrocarbyl sulfonate, and hydrocarbyl sulfate, and is more preferably, one or a combination of more of sodium α-alkenyl sulfonate (AOS), sodium dodecyl sulfate (SDS) and sodium dodecyl benzene sulfonate (SDBS).

In the above composition of nano-emulsion having small particle size and ultra-low concentration, preferably, in the raw materials of the polymer-containing homogeneous microemulsion, the polymer comprises one or a combination of more of ethylene glycol polyether, propylene glycol block polyether, propanetriol block polyether, ethylene glycol-propylene glycol block polyether, polyethylene polyamine block polyether, alkyl phenolic resin block polyether and the like; more preferably, the polymer comprises one or more of ethylene glycol-propylene glycol block polyether (for example, L64, $PEO_{13}PPO_{30}PEO_{13}$), propylene glycol block polyether (for example, SP169 (Manufacturer: Jiangsu Hai'an Petrochemical Plant)), polyethylene polyamine block polyether (for example, AP121 (Manufacturer: Jiangsu Hai'an Petrochemical Plant)) and the like.

In the above composition of nano-emulsion having small particle size and ultra-low concentration, preferably, in the raw materials of the polymer-containing homogeneous microemulsion, the alcohol comprises one or a combination of more of ethanol, propanol, isopropanol, ethylene glycol, propylene glycol, glycerol, butanol, pentanol, hexanol, heptanol, octanol and the like.

In the above composition of nano-emulsion having small particle size and ultra-low concentration, preferably, in the raw materials of the polymer-containing homogeneous microemulsion, the oil comprises one or a combination of more of aliphatic hydrocarbon compounds, aromatic hydrocarbon compounds, ester compounds, terpenoids and the like; more preferably, the oil is one or a combination of more of hexane, octane, petroleum ether, kerosene, diesel, toluene, xylene, trimethylbenzene, ethyl acetate, ethyl lactate, terpineol, limonene and the like.

In the above composition of nano-emulsion having small particle size and ultra-low concentration, in the raw materials of the polymer-containing homogeneous microemulsion, preferably, the salt comprises one or a combination of more of sodium salts, potassium salts, magnesium salts, calcium salts, aluminum salts, ammonium salts, tetramethylammonium salts and the like; more preferably, the salt is one or a combination of more of NaCl, NaBr, KCl, KBr, $Na_2SO_4$, $K_2SO_4$, $MgCl_2$, $MgBr_2$, $CaCl_2$, $MgSO_4$, $AlCl_3$, $NH_4Cl$, $NH_4Br$, $N(CH_3)_4Cl$, and $N(CH_3)_4Br$.

By adding a polymer to a conventional homogeneous microemulsion to improve its assembly ability, the present invention make it to be capable of obtaining a stable nano-emulsion system even under conditions of sufficient dilution with water or salt solution. The added polymer can spontaneously expand into a random coil in an aqueous solution, which can achieve two effects: first, dispersing the nano droplets to make the particle size smaller and increase the specific surface area; second, stabilizing the nano emulsion particles to prevent them from rupturing or coalescing at low concentrations. The composition of nano-emulsion having small particle size and ultra-low concentration provided by the present invention is a homogeneous transparent liquid-liquid dispersion system, with a good stability, and the emulsion has a particle size of 5 to 30 nm, a narrow particle size distribution, low concentration and low cost.

The present invention further provides a preparation method of the above composition of nano-emulsion having small particle size and ultra-low concentration, comprising steps of:
(1) mixing uniformly the surfactant, polymer, alcohol, oil, optional salt (adding salt or adding no salt), and water in proportion, to obtain the polymer-containing homogeneous microemulsion; and
(2) proportionally diluting the polymer-containing homogeneous microemulsion with water or the organic salt solution or inorganic salt solution, to obtain the composition of nano-emulsion having small particle size and ultra-low concentration.

In the step (1) of the above preparation method, there are no special requirements for the order by which the surfactant, polymer, alcohol, oil, optional salt and water are mixed. For a solid surfactant, it can be dissolved with water or alcohol before mixing with other substances to speed up the dissolution. Any one of the surfactant, polymer, alcohol, oil and salt used may be one kind or a combination of more than one kinds. The mixing of the surfactant, polymer, alcohol, oil, optional salt and water can be simply shaking or stirring evenly.

In the step (1) of the above production method, the ratio of the surfactant, alcohol, oil and water or salt solution is determined by a phase diagram, and the addition amount of the polymer can be adjusted in real time as needed. The phase diagram is shown in FIG. 1, wherein the ideal mixing ratio of the components is near the P point. Near the P point, the microemulsion has the following characteristics: first, the resulting microemulsion is a homogeneous microemulsion (1Φ), a Winsor type IV microemulsion known in the art; second, the resulting microemulsion is near a specific zone with ultra-low interfacial tension in the process of water dilution (P point directing to the water/salt solution end of the phase diagram) (Journal of Chemical Physics, 1997, 106(20):8606-8615.), i.e., a three-phase zone (3Φ) known in the art; third, the resulting microemulsion dilution process cannot pass through the two-phase zone (2Φ), otherwise a conventional emulsion is obtained. The use of homogeneous microemulsion can make the system homogeneous and stable; close to the three-phase zone without crossing the two-phase zone to ensure that the solution is diluted, the interfacial tension of the solution is low, no emulsification occurs, and the dilution stability is high; the addition of the polymer allows the entire system to be diluted to have a narrow particle size distribution and good dispersibility.

In the above preparation method, preferably, in the step (2), the proportionally diluting the polymer-containing homogeneous microemulsion with water or the organic salt solution or inorganic salt solution is performed in one of the following four ways: (1) adding the polymer-containing homogeneous microemulsion dropwise to the water or organic salt solution or inorganic salt solution; (2) adding the polymer-containing homogeneous microemulsion to the water or organic salt solution or inorganic salt solution in one portion; (3) adding the water or organic salt solution or inorganic salt solution dropwise to the polymer-containing homogeneous microemulsion; (4) adding the water or organic salt solution or inorganic salt solution to the polymer-containing homogeneous microemulsion in one portion. The dispersibility of the nonionic surfactant system is not sensitive to the dilution sequence. The ionic surfactant system has a certain influence on the dilution order, but does not affect falling of its particle size in the nanometer scale range. The composition of nano-emulsion system of the present invention can be obtained by simply shaking or stirring evenly during or after mixing in one of the above four ways.

The beneficial effects of the invention mainly include: 1) a polymer is introduced into the composition of nano-emulsion system, such that the concentration of the nano-emulsion is sufficiently reduced and the cost is lowered; 2) the particle size of the emulsion is small (5 to 30 nm), the distribution is narrow, and the emulsion has a huge specific surface area, and an improved molecular utilization; 3) the system is diverse, and the suitable nano-emulsion can be customized according to the application requirements.

DETAILED DESCRIPTION OF PREFERRED EMBODIMENTS

In order to more clearly understand the technical features, objects, and beneficial effects of the present invention, the technical solutions of the present invention are described in detail below, but are not to be construed as limiting the scope of the invention.

Example 1

Figure 1:
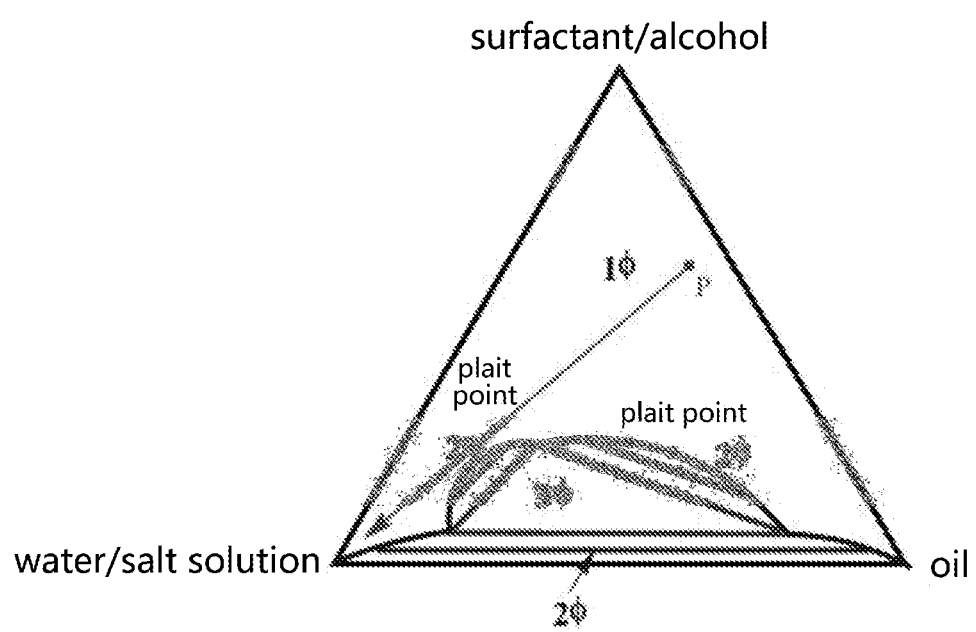
FIG. 1 is a phase diagram of microemulsion composed of surfactant, alcohol, oil and water or salt solution.
Figure 2:
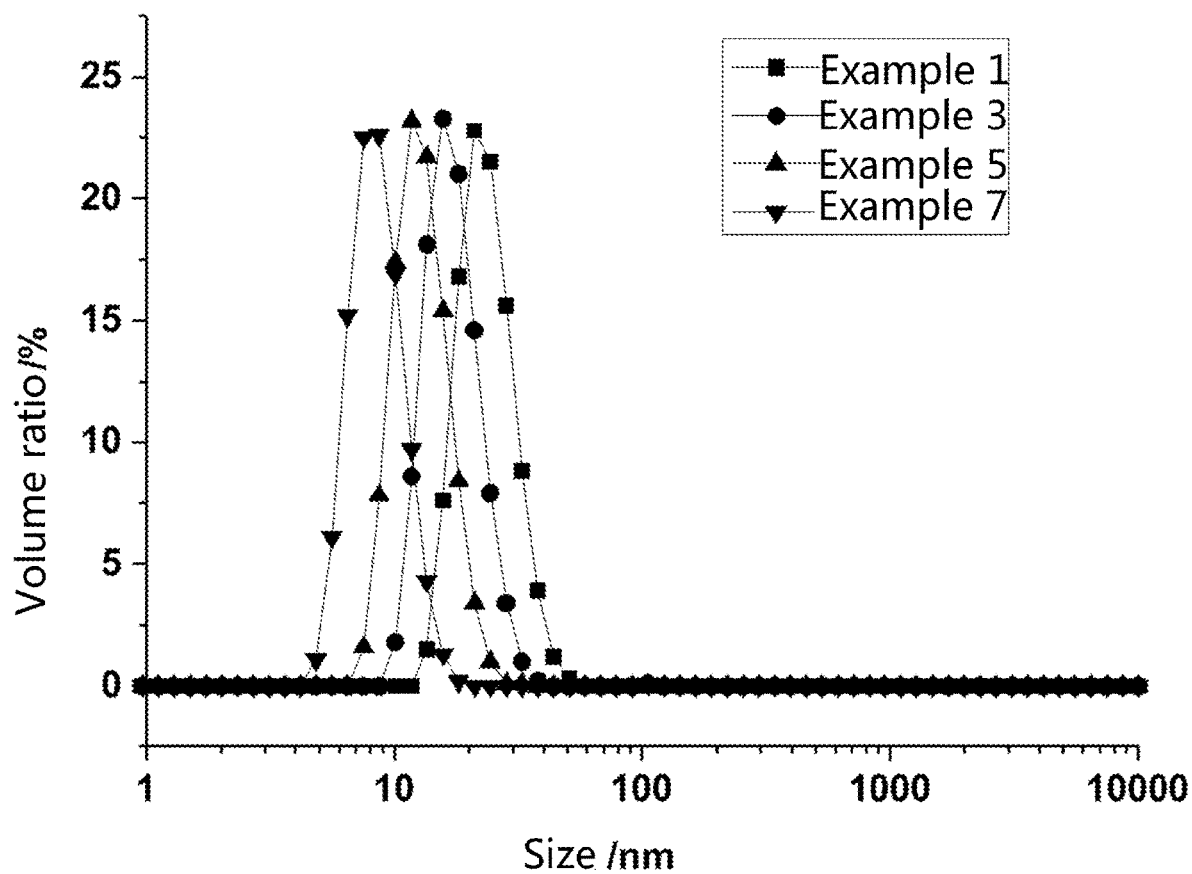
FIG. 2 is a particle size and particle size distribution diagram of composition of nano-emulsion having small particle size and ultra-low concentrations prepared in Examples 1, 3, 5, and 7.

This example provides a composition of nano-emulsion having small particle size and ultra-low concentration which is prepared by the following steps:
(1) 3 parts of octane, 37.5 parts of water, 40 parts of an anionic surfactant AOS, 18 parts of n-butanol, 0.5 parts of ethylene glycol-propylene glycol block polyether L64 (Manufacturer: BASF, Germany) and 1 part of NaCl were taken based on 100 parts by weight, and then placed together in a reactor and mixed uniformly, to obtain a polymer-containing homogeneous microemulsion.
(2) 0.2 parts by weight of the above polymer-containing homogeneous microemulsion was taken and added dropwise to 99.8 parts by weight of water stirred at 300 rpm to obtain a 0.2% anionic nano-emulsion, i.e., the composition of nano-emulsion having small particle size and ultra-low concentration which has a transparent system and is stable for a long term. The particle size was measured to be 21.1 nm by means of dynamic light scattering (see FIG. 2).

Example 2

This example provides a composition of nano-emulsion having small particle size and ultra-low concentration which is prepared by the following steps:
(1) 5 parts of hexane, 25 parts of water, 45 parts of a cationic surfactant DTAB, 5 parts of propylene glycol block polyether SP169 (Manufacturer: Jiangsu Hai'an Petrochemical Plant) and 20 parts of n-octanol were taken based on 100 parts by weight, and then placed together in a reactor and mixed uniformly, to obtain a polymer-containing homogeneous microemulsion.
(2) 0.1 parts by weight of the above polymer-containing homogeneous microemulsion was taken and added dropwise to 99.1 parts by weight of a 2 wt % KCl solution stirred at 300 rpm to obtain a 0.1% cationic nano-emulsion, i.e., the composition of nano-emulsion having small particle size and ultra-low concentration which has a transparent system and is stable for a long term. The particle size was measured to be 26.3 nm by means of dynamic light scattering.

Example 3

(1) 20 parts of toluene, 22 parts of water, 30 parts of a nonionic surfactant OP-7, 8 parts of polyethylene polyamine block polyether AP121 (Manufacturer: Jiangsu Hai'an Petrochemical Plant), 15 parts of isopropanol and 5 parts of glycerol were taken based on 100 parts by weight, and then placed together in a reactor and mixed uniformly, to obtain a polymer-containing homogeneous microemulsion.
(2) 0.1 parts by weight of the above polymer-containing homogeneous microemulsion was taken and added dropwise to 99.9 parts by weight of a 4 wt % NaCl solution stirred at 300 rpm to obtain a 0.1% nonionic nano-emulsion, i.e., the composition of nano-emulsion having small particle size and ultra-low concentration which has a transparent system and is stable for a long term. The particle size was measured to be 15.7 nm by means of dynamic light scattering (see FIG. 2).

Example 4

(1) 30 parts of xylene, 5 parts of polyethylene polyamine block polyether AR16 (Manufacturer: Jiangsu Hai'an Petrochemical Plant), 30 parts of a nonionic surfactant LAE-9, 5 parts of isopropanol, 5 parts of glycerol and 25 parts of water were taken based on 100 parts by weight, and then placed together in a reactor and mixed uniformly, to obtain a polymer-containing homogeneous microemulsion.
(2) 0.05 parts by weight of the above polymer-containing homogeneous microemulsion was taken and added dropwise to 99.95 parts by weight of a 2 wt % $NH_4Cl$ solution stirred at 300 rpm to obtain a 0.05% nonionic nano-emulsion, i.e., the composition of nano-emulsion having small particle size and ultra-low concentration which has a transparent system and is stable for a long term. The particle size was measured to be 13.2 nm by means of dynamic light scattering.

Example 5

(1) 20 parts of ethyl lactate, 30 parts of water, 6 parts of polyethylene polyamine block polyether AE1910, 30 parts of a nonionic surfactant AEO-9, 10 parts of isopropanol and 4 parts of glycerol were taken based on 100 parts by weight, and then placed together in a reactor and mixed uniformly, to obtain a polymer-containing homogeneous microemulsion.
(2) 0.02 parts by weight of the above polymer-containing homogeneous microemulsion was taken and added dropwise to 99.98 parts by weight of a 0.7 wt % $N(CH_3)_4Cl$ solution stirred at 300 rpm to obtain a 0.02% nonionic nano-emulsion, i.e., the composition of nano-emulsion having small particle size and ultra-low concentration which has a transparent system and is stable for a long term. The particle size was measured to be 13.5 nm by means of dynamic light scattering (see FIG. 2).

Example 6

(1) 15 parts of ethyl acetate, 25 parts of water, 3 parts of polyethylene polyamine block polyether AF3111 (Manufacturer: Jiangsu Hai'an Petrochemical Plant), 35 parts of a nonionic surfactant LAE-9, 15 parts of isopropanol and 7 parts of ethylene glycol were taken based on 100 parts by weight, and then placed together in a reactor and mixed uniformly, to obtain a polymer-containing homogeneous microemulsion.
(2) 0.1 parts by weight of the above polymer-containing homogeneous microemulsion was taken and added dropwise to 99.9 parts by weight of a 10 wt % KCl solution stirred at 300 rpm to obtain a 0.1% nonionic nano-emulsion, i.e., the composition of nano-emulsion having small particle size and ultra-low concentration which has a transparent system and is stable for a long term. The particle size was measured to be 15.7 nm by means of dynamic light scattering.

Example 7

(1) 3 parts of pinene, 55 parts of water, 10 parts of polyethylene polyamine block polyether AF3111, 8 parts of a nonionic surfactant 0-10, 15 parts of octanol and 9 parts of propylene glycol were taken based on 100 parts by weight, and then placed together in a reactor and mixed uniformly, to obtain a polymer-containing homogeneous microemulsion.
(2) 0.1 parts by weight of the above polymer-containing homogeneous microemulsion was taken and added dropwise to 99.9 parts by weight of a 2 wt % KCl solution stirred at 300 rpm to obtain a 0.1% nonionic nano-emulsion, i.e., the composition of nano-emulsion having small particle size and ultra-low concentration which has a transparent system and is stable for a long term. The particle size was measured to be 8.7 nm by means of dynamic light scattering (see FIG. 2).

Example 8

(1) 5 parts of α-terpineol, 25 parts of water, 32 parts of a nonionic surfactant APG1214, 5 parts of polyethylene polyamine block polyether AF3111, 5 parts of polymer L64, 25 parts of ethanol and 3 parts of glycerol were taken based on 100 parts by weight, and then placed together in a reactor and mixed uniformly, to obtain a polymer-containing homogeneous microemulsion.
(2) 0.002 parts by weight of the above polymer-containing homogeneous microemulsion was taken, added to 100 parts of 2 wt % $CaCl_2$ solution in one portion and shaken to obtain a 0.002% nonionic nano-emulsion, i.e., the composition of nano-emulsion having small particle size and ultra-low concentration which has a transparent system and is stable for a long term. The particle size was measured to be 6.1 nm by means of dynamic light scattering.

Example 9

(1) 10 parts of kerosene, 35 parts of water, 5 parts of propylene glycol block polyether SP169, 22 parts of a nonionic surfactant EL-40, 5 parts of an anionic surfactant AOS and 23 parts of isopropanol were taken based on 100 parts by weight, and then placed together in a reactor and mixed uniformly, to obtain a polymer-containing homogeneous microemulsion.
(2) 0.1 parts by weight of the above polymer-containing homogeneous microemulsion was taken, added to 99.9 parts of 2 wt % $Na_2SO_4$ solution in one portion and shaken to obtain a 0.1% nonionic nano-emulsion, i.e., the composition of nano-emulsion having small particle size and ultra-low concentration which has a transparent system and is stable for a long term. The particle size was measured to be 15.8 nm by means of dynamic light scattering.

Comparative Example 1

Basically the same as Example 1, except that: no alcohol was added in the formulation of polymer-containing homogeneous microemulsion. The specific composition and preparation method of the microemulsion of this comparative example is: 3 parts of octane, 55.5 parts of water, 40 parts of an anionic surfactant AOS, 0.5 parts of ethylene glycol-propylene glycol block polyether L64 (Manufacturer: BASF, Germany) and 1 part of NaCl were taken based on 100 parts by weight, and then placed together in a reactor and mixed uniformly, to obtain a milky white emulsion. The emulsion has a particle size of 1 to 100 μm, and the nano-sized liquid as prepared in the examples of the present invention cannot be obtained.

Comparative Example 2

Figure 3:
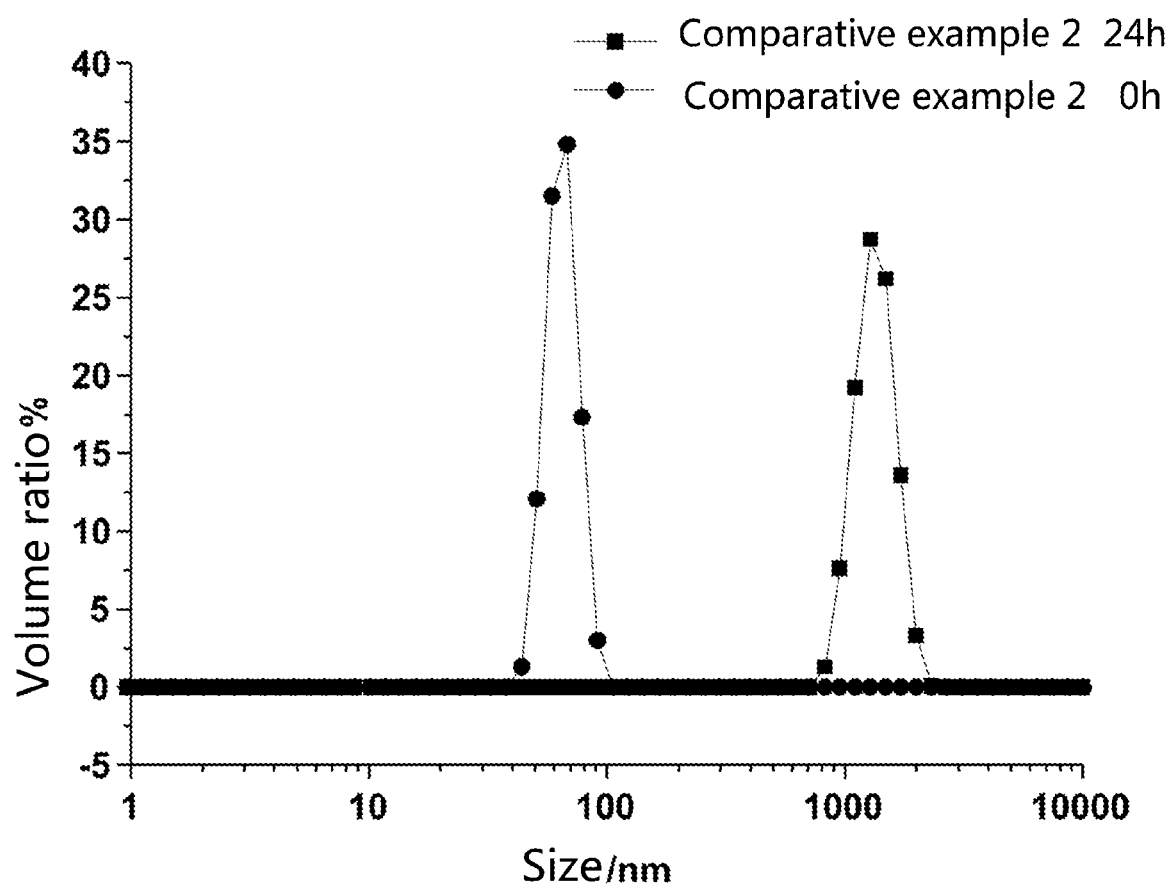
FIG. 3 is a graph showing changes in particle size and particle size distribution of the emulsion composition of Comparative Example 2 over time.

Basically the same as Example 1, except that: no polymer was added in the formulation of polymer-containing homogeneous microemulsion. The specific composition and preparation method of the microemulsion of this comparative example is: 3 parts of octane, 38 parts of water, 40 parts of an anionic surfactant AOS, 18 parts of n-butanol and 1 part of NaCl were taken based on 100 parts by weight, and then placed together in a reactor and mixed uniformly, to obtain a clear and transparent homogeneous microemulsion containing no polymer.
0.2 parts by weight of the above homogeneous microemulsion containing no polymer was taken and added dropwise to 99.8 parts by weight of water stirred at 300 rpm to obtain a 0.2% dilution system. The system was initially transparent and then gradually cloudy and not stable enough. The particle size was measured to be 68.1 nm by means of dynamic light scattering. After standing for 24 hours, the particle size was measured to be 1281 nm, which has entered the emulsion range (see FIG. 3).

Comparative Example 3

Basically the same as Example 1, except that: no surfactant was added in the formulation of polymer-containing homogeneous microemulsion. The specific composition and preparation method of the microemulsion of this comparative example is: 3 parts of octane, 77.5 parts of water, 18 parts of n-butanol, 0.5 parts of ethylene glycol-propylene glycol block polyether L64 (Manufacturer: BASF, Germany) and 1 part of NaCl were taken based on 100 parts by weight, and then placed together in a reactor and mixed uniformly. Phases were separated in this system and cannot be miscible.

Testing Example 1

The composition of nano-emulsions prepared in Examples 1, 3, 5, and 7 were taken and left to stand for 24 hours, and the particle diameters were measured again by dynamic light scattering. The results were 22.1 nm, 15.4 nm, 13.1 nm, and 8.3 nm, indicating that the stability of the systems is good, and no obvious changes have occurred in the storage process. From the appearance, no phase separation and turbidity occurred after a long term (>2 weeks) storage.

In summary, the composition system of nano-emulsion having small particle size and ultra-low concentration of the invention is simple in preparation, cheap in raw materials, commercial easily available, transparent in system, and has long-term stability. According to the testing of particle size and particle size distribution (see FIG. 2), these nano-emulsion systems have a narrow particle size distribution of 5 to 30 nm, good dispersibility, and long-time stability, and thus show obvious superiority.

The invention claimed is:

1. A nano-emulsion composition having a small particle size and ultra-low concentration, the raw materials of which comprise, in terms of percentage by weight, 0.002% to 0.2% of a polymer-containing homogeneous microemulsion, water, and 99.998% to 99.8% of an organic salt solution or inorganic salt solution,
   wherein the polymer-containing homogeneous microemulsion is formed by mixing the following raw materials, in terms of percentage by weight: 8% to 40% of a surfactant, 0.5% to 10% of a polymer, 10% to 30% of an alcohol, 3% to 30% of an oil, 0% to 20% of a salt, and balance of water,
   wherein the polymer is selected from the group consisting of one or a combination of more than one of propylene glycol block polyether, propanetriol block polyether, ethylene glycol-propylene glycol block polyether, polyethylene polyamine block polyether, and alkyl phenolic resin block polyether, and
   wherein the nano-emulsion composition is prepared by following steps:
   (1) mixing uniformly the surfactant, polymer, alcohol, oil, water, and optionally the salt in proportion to obtain the polymer-containing homogeneous microemulsion; and
   (2) proportionally diluting the polymer-containing homogeneous microemulsion with water or the organic salt solution or inorganic salt solution to obtain the nano-emulsion composition having a small particle size and ultra-low concentration.

2. The nano-emulsion composition having a small particle size and ultra-low concentration according to claim 1, wherein the nano-emulsion composition is a homogeneous transparent liquid-liquid dispersion system in which the emulsion has a particle size of 5 to 30 nm.

3. The nano-emulsion composition having a small particle size and ultra-low concentration according to claim 1, wherein the surfactant is selected from the group consisting of one or a combination of more than one of a nonionic surfactant, a cationic surfactant and an anionic surfactant;
   wherein the nonionic surfactant is selected from the group consisting of one or a combination of more than one of alkyl polyoxyethylene ether, alkylamine polyoxyethylene ether, alkylphenol polyoxyethylene ether, castor oil polyoxyethylene ether and alkyl glycoside;
   wherein the cationic surfactant is selected from the group consisting of one or a combination of more than one of alkyl trimethyl ammonium bromide and alkyl trimethyl ammonium chloride; and
   wherein the anionic surfactant is selected from the group consisting of one or a combination of more than one of hydrocarbyl carboxylate, hydrocarbyl sulfonate, and hydrocarbyl sulfate.

4. The nano-emulsion composition having a small particle size and ultra-low concentration according to claim 1, wherein the alcohol is selected from the group consisting of one or a combination of more than one of ethanol, propanol, isopropanol, ethylene glycol, propylene glycol, glycerol, butanol, pentanol, hexanol, heptanol, and octanol.

5. The nano-emulsion composition having a small particle size and ultra-low concentration according to claim 1, wherein the oil is selected from the group consisting of one or a combination of more than one of aliphatic hydrocarbon compounds, aromatic hydrocarbon compounds, ester compounds, and terpenoids.

6. The nano-emulsion composition having a small particle size and ultra-low concentration according to claim 1, wherein the organic salt solution or the inorganic salt solution each has a concentration by mass of 0.001 to 20%.

7. The nano-emulsion composition having a small particle size and ultra-low concentration according to claim 1, wherein the salts in the organic salt solution or inorganic salt solution is selected from the group consisting of one or a combination of more than one of sodium salts, potassium salts, magnesium salts, calcium salts, aluminum salts, ammonium salts, and tetramethylammonium salts.

8. The nano-emulsion composition having a small particle size and ultra-low concentration according to claim 3, wherein the alkyl polyoxyethylene ether, alkylphenol polyoxyethylene ether and castor oil polyoxyethylene ether have a polyoxyethylene value of from 4 to 10.

9. The nano-emulsion composition having a small particle size and ultra-low concentration according to claim 3, wherein the cationic surfactant is selected from the group consisting of one or a combination of more than one of dodecyl trimethyl ammonium bromide, tetradecyl trimethyl ammonium bromide, hexadecyl trimethyl ammonium bromide, dodecyl trimethyl ammonium chloride, and tetradecyl trimethyl ammonium chloride.

10. The nano-emulsion composition having a small particle size and ultra-low concentration according to claim 3, wherein the anionic surfactant is selected from the group consisting of one or a combination of more than one of sodium α-alkenyl sulfonate, sodium dodecyl sulfate, and sodium dodecyl benzene sulfonate.

11. The nano-emulsion composition having a small particle size and ultra-low concentration according to claim 5, wherein the oil is selected from the group consisting of one or a combination of more than one of hexane, octane, petroleum ether, kerosene, diesel, toluene, xylene, trimethylbenzene, ethyl acetate, ethyl lactate, terpineol, and limonene.

12. The nano-emulsion composition having a small particle size and ultra-low concentration according to claim 7, wherein the salt is selected from the group consisting of one or a combination of more than one of NaCl, NaBr, KCl, KBr, $Na_2SO_4$, $K_2SO_4$, $MgCl_2$, $MgBr_2$, $CaCl_2$, $MgSO_4$, $AlCl_3$, $NH_4Cl$, $NH_4Br$, $N(CH_3)_4Cl$, and $N(CH_3)_4Br$.

* * * * *